United States Patent

Spaulding

[15] 3,646,480

[45] Feb. 29, 1972

[54] RECURSIVE AUTOMATIC EQUALIZER

[72] Inventor: David Adams Spaulding, Colts Neck, N.J.

[73] Assignee: Bell Telephone Laboratories, Incorporated, Murray Hill, N.J.

[22] Filed: Dec. 24, 1970

[21] Appl. No.: 101,379

[52] U.S. Cl. ....................333/18, 328/14, 328/167, 333/70 T

[51] Int. Cl. ....................H04b 3/04

[58] Field of Search ....................333/18, 70 T; 328/14, 167

[56] References Cited

UNITED STATES PATENTS

| | | | |
|---|---|---|---|
| 3,375,473 | 3/1968 | Lucky | 333/18 |
| 3,508,172 | 4/1970 | Kretzmer et al. | 333/18 |

*Primary Examiner*—Herman Karl Saalbach
*Assistant Examiner*—Paul L. Gensler
*Attorney*—R. J. Guenther and Kenneth B. Hamlin

[57] ABSTRACT

A general-purpose synthesizer or equalizer combining recursive and nonrecursive signal paths automatically compensates a distorting transmission medium in order to achieve a desired overall transfer function (ratio of output to input parameters). Zeros of transmission are adjusted in the equalizer by direct correlation of the error difference between the actual equalizer output and a reference output with a plurality of filtered samples of the distorted signal. Poles are adjusted in parallel paths within the equalizer for each of which paths individual samples are first filtered in a duplicate of the recursive portion of the basic equalizer and correlated with the above error differences. Inputs to the equalizer are furnished in common to each of the parallel paths, which comprises simple second order recursive filters, to realize poles of resonance. The output of the equalizer is composed of signal samples from the several parallel paths to realize transmission zeros.

8 Claims, 4 Drawing Figures

INVENTOR
BY D. A. SPAULDING

J. P. Kearns
ATTORNEY

RECURSIVE AUTOMATIC EQUALIZER

FIELD OF THE INVENTION

This invention relates generally to electric waveform processing systems and in particular to automatic systems for synthesizing arbitrary transfer functions or equalizing distorting transmission media.

BACKGROUND OF THE INVENTION

The automatic time-domain equalizer disclosed by R. W. Lucky in U.S. Pat. No. 3,375,437, issued Mar. 26, 1968, compensates for impulse response distortion at discrete sampling times by adjusting zeros of transmission in accordance with a mean-square error criterion. This approach is satisfactory for synchronous digital signaling systems. However, in many circumstances including digital as well as analog signaling an equalizer that controls zeros of transmission alone cannot control the frequency response, which is determined jointly by the poles, i.e., frequencies of natural resonance, and zeros of the transfer function being synthesized or compensated as effectively or as readily as an equalizer which can control poles as well as zeros. The transfer function of an electrical system is the Fourier transform of the time response of such a system to an impulse excitation applied to its input. If the system comprises a network having lumped circuit elements the transfer function reduces to a rational fraction, i.e., the ratio of two polynomials in the complex frequency parameter $j\omega$, where $j=\sqrt{-1}$. The roots of the numerator polynomial locate the position of the zeros of transmission in the complex frequency plane having respective real and imaginary axes. The roots of the denominator polynomial locate the position of the poles in the same plane. The poles and zeros define the transfer function of the electrical system except for a scale factor. The transfer function as evaluated for real values of $\omega$ then represents the physically realized amplitude and delay responses of the electrical network.

In my U.S. Pat. No. 3,539,937, granted Nov. 10, 1970, and entitled "Electric Wave Filter Synthesis," I have described a distributed resistance-capacitance (RC) transmission line provided with a plurality of taps and corresponding pluralities of feedforward and feedback paths. This transmission line is capable of adjustment to synthesize rational transfer functions by calculation of individual weighting coefficients for the several signal paths. The weighting coefficients effective in the feedforward and feedback paths are related respectively to the zeros and poles of the synthesized transfer function. Although it has not been found practicable to control poles automatically in the same manner as that in which Lucky controlled zeros due to the inherent instability of feedback or recursive structures, I have discovered that particular second order structures with feedback coefficients limited to positive resistance values can be constrained to be unconditionally stable. Automatic adjustment of transmission poles thus becomes possible.

It is accordingly a principal object of this invention to provide an automatic equalizer capable of synthesizing both poles and zeros of an arbitrary transfer function.

It is another object of this invention to permit the equalization of a distorting transmission channel over a continuous frequency band automatically.

It is still another object of this invention effectively to synthesize the poles as well as zeros of an arbitrary transfer function automatically by comparison with a reference function.

It is yet another object of this invention to approximate and synthesize an arbitrary rational transfer function in a structure which is expandable at will to attain any desired degree of precision.

It is also an object of this invention to equalize the response of a communication channel for analog, as well as digital, signals.

SUMMARY OF THE INVENTION

According to this invention a plurality of recursive second-order tapped structures are combined in parallel branches between a signal source and sink. Each second-order structure includes input, output, and intermediate taps. Each intermediate and output tap of the respective branches has a weighted feedback connection to its input. Furthermore, each intermediate and output tap of each branch has a weighted feedforward connection to its output. First linear combinations of weighted voltages from the output and the intermediate taps are thus added to the input signal to be filtered in order to form the driving signals for each branch. Second linear combinations of weighted voltages from the intermediate and output taps then constitute the output signal from a given branch. The weighting coefficients by which the feedback voltages are multiplied are directly related to the poles of the compensating or synthesizing transfer function, while the weighting coefficients by which the feedforward tap voltages are multiplied are directly related to the zeros of the same transfer function. While the feedforward coefficients are free to assume positive and negative values as in the conventional transversal equalizer, the feedback coefficients are constrained to positive values only, thereby providing unconditional stability. The second-order transfer functions of the separate branches combine additively with the weighted input signal and thus make possible the realization of higher order overall transfer functions.

Further, in accordance with this invention the summation of weighted feedforward signals is compared with the desired output obtained, for example, by transmitting a given test signal, of the same characteristics as that transmitted through a channel being equalized, such as an impulse through a reference filter having the required transfer function to obtain an error difference. This error difference is correlated directly with samples of the signal at each tap of the equalizer to obtain adjustment signals for the feedforward weighting coefficients to be applied to the respective taps in a manner analogous to that disclosed in the cited Lucky patent. Such adjustment of the feedforward weighting coefficients minimizes the mean-square error between the reference signal and the composite signal in the output of the equalizer with respect to each feedforward weighting coefficient.

The same correlation cannot, however, be used for adjustment of feedback coefficients because the mean-square error will not thereby be reduced. Instead, individual summations of the weighted output from each parallel branch constituting a second order network are themselves filtered in auxiliary tapped second order networks with feedback coefficients exactly matching those of the equalizer structure, but having no feedforward weights. The individual tap outputs of the auxiliary networks are correlated with the previously described error difference to obtain control signals for the feedback weighting coefficients of both equalizer and auxiliary filter structures.

Adjustments of both feedforward and feedback coefficients may be either incremental or proportional. As long as the feedback coefficients are constrained to positive values, which can be realized solely by resistive elements without gain devices, both equalizer and auxiliary structures are unconditionally stable.

A feature of the invention is the elimination of the tapped analog delay line previously employed in equalizers of the time-domain type.

Another feature is that the implementation can be accomplished using only known capacitors, resistors, and operational amplifiers.

DESCRIPTION OF THE DRAWING

The above and other objects and features of this invention will be appreciated from a consideration of the following detailed description and the drawing in which.

DETAILED DESCRIPTION

Figure 1:
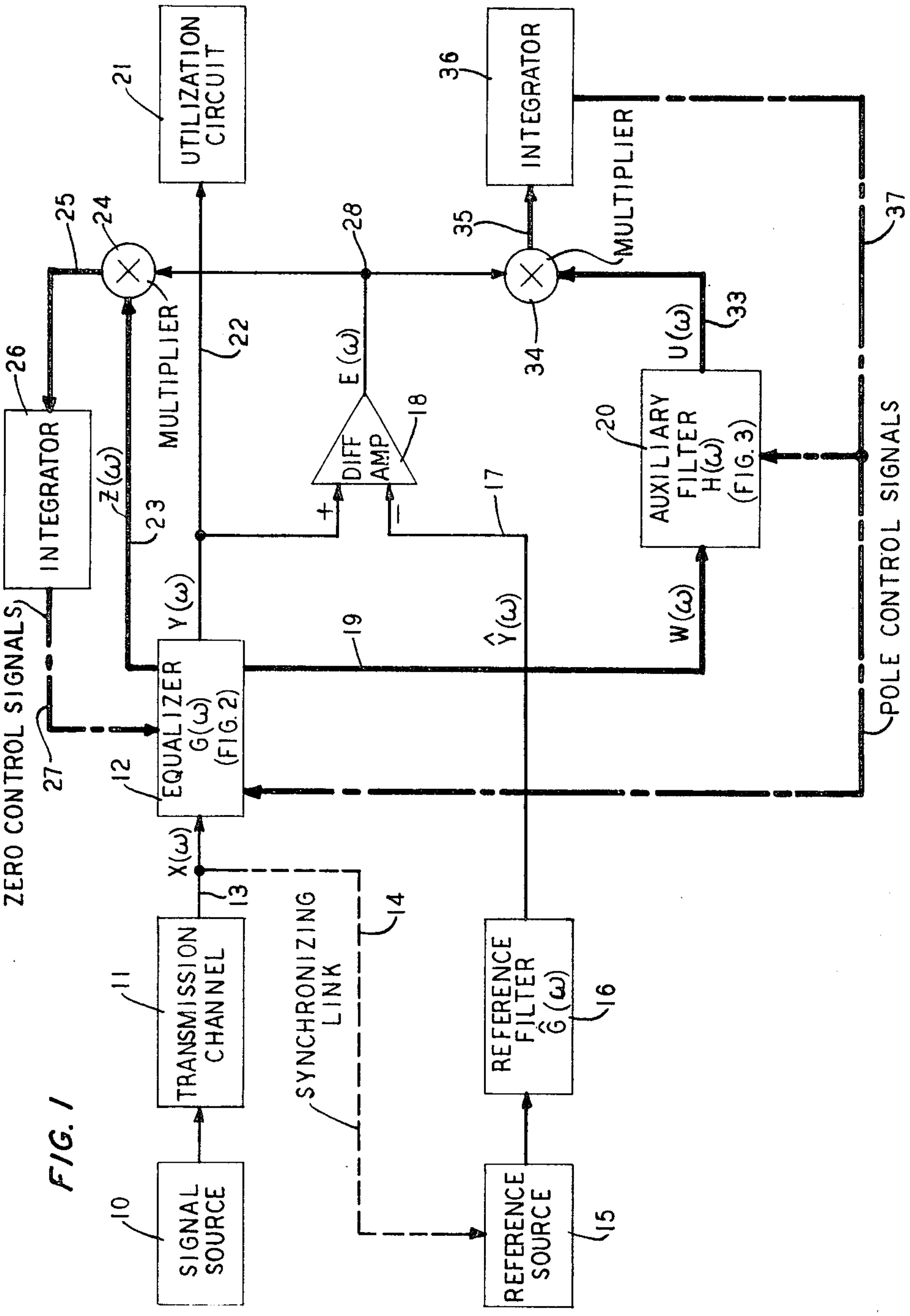
FIG. 1 is a generalized block schematic diagram of the equalizer of this invention together with control circuits for automatic adjustment thereof.

FIG. 1 constitutes the system block diagram for the automatic equalizer or electric-wave synthesizer of this invention. In the equalizer aspect the system comprises a signal source 10 of arbitrary nature supplying intelligence or test signals to a distorting transmission channel 11 for delivery to a utilization circuit 21. To the extent that the distortion present in channel 11 results in an unacceptable performance at utilization circuit 21, an equalizer 12 is advantageously interposed between channel 11 and utilization circuit 21. Equalizer 12 must provide a characteristic or transfer function which will compensate for the distortions generated in channel 11 and will maximize the performance of utilization circuit 21.

A useful criterion for measuring distortion and performance is the mean-square error criterion obtainable in practice as the average squared difference between an actual system output and an ideal reference output. The system of FIG. 1 provides such an error difference by providing at the receiving terminal of the system a reference signal source 15 and a reference shaping filter 16 in cascade. In the case where a channel is being equalized by sending a signal of known characteristics from source 10, reference source 15 is arranged to generate the same signal as that of transmitting source 10. Sources 10 and 15 can be any signals having frequency spectra matching those for which transmission channel 11 is to be used. These sources can be used either alone for initial adjustment of the equalizer or, in conjunction with message signals transmitted through channel 11, for adaptive adjustment. The action of equalizer 12 is such as to minimize the mean-square error and consequently the equalized distortion. Synchronizing link 14, shown as a broken line between the output of channel 11 and reference source 15, triggers reference source 15 at the proper moment relative to the arrival of the transmitted signal so that the error difference will have meaning, when a known signal is being transmitted for equalization purposes.

If the signal at the output of channel 11 is designated by its Fourier transform $X(\omega)$ and the transfer function of equalizer 12 is called $G(\omega)$, the equalized output signal $Y(\omega)$ on lead is $$Y(\omega)=X(\omega)G(\omega). \qquad (1)$$

The desired signal output for the test signal that produced $X(\omega)$ in the output of channel 11 had channel 11 been ideal is designated $\hat{Y}(\omega)$ and is found in the output of reference filter 16, whose transfer function is designated $\hat{G}(\omega)$. The error signal $E(\omega)$ is found by taking in difference amplifier 18 the difference between equalized signal $Y(\omega)$ and ideal signal $\hat{Y}(\omega)$. Thus, $$E(\omega)=Y(\omega)-\hat{Y}(\omega). \qquad (2)$$

The mean-square error is represented as $$E=\frac{1}{2\pi}\int_{-\infty}^{\infty}|E(\omega)|^2 d\omega \qquad (3)$$

The error E, and hence equalizer distortion, can be made small by first finding the gradient of $E$ (grad $E$) with respect to the adjustable parameters of the equalizer and by then adjusting these parameters to bring grad $E$ as close to zero as possible.

It can be shown that grad $E$ of the mean-square error $E$ of equation (3) is a vector whose components are the partial derivatives of $E$ with respect to the tap weighting coefficients in the equalizer. Reference is here made in this connection to the paper entitled "An Automatic Equalizer for General-Purpose Communication Channels" by R. W. Lucky and H. R. Rudin published in the Nov. 1967 issue of the *Bell System Technical Journal* (Vol. XLVI, No. 9, pp. 2179 to 2,208). This principle has been applied to transversal equalizers with feedforward weighting paths where adequate equalization could be realized by controlling zeros of transmission only.

In FIG. 1, a zero control path is indicated by cable 27 (a thick broken line) which joins the output of integrator 26 to an input of equalizer 12. Equalizer 12 provides tap outputs $Z(\omega)$ in cable 23, which are multiplied in multiplier 24 by error signal $E(\omega)$ available at junction 28.

An analysis of the principle of the invention follows:

The ratio of the Fourier transforms of the output and input of an electrical network, which is termed its transfer function, is in its generalized form, a function of the complex frequency variable $j\omega$. If the network is composed of lumped elements (resistors, capacitors, and inductors) the transfer function reduces to a ratio of polynomials (a summation of a finite number of algebraic terms) in $j\omega$. The coefficients of the several powers of $j\omega$ found in the respective numerator and denominator polynomials determine their roots and hence the positions of zeros and poles of the transfer function which may be plotted in the complex frequency plane.

In my above-mentioned U.S. Pat. No. 3,539,937 the relationships of the feedforward and feedback coefficients of a recursive distributed RC filter to the respective zeros and poles of a transfer function implemented thereby was demonstrated. Equalizer 12 of FIG. 1 is similar in concept with respect to the existence of feedback and feedforward paths to the electric-wave synthesizer of that application. However, where the several coefficients were there obtained solely by calculation, they are now to be obtained automatically.

The transfer function $G(\omega)$ of equalizer 12 is necessarily a ratio of polynomials. Coefficients in the numerator determine zeros of transmission. Coefficients in the denominator determine poles of resonance. Because $Y(\omega)$, the output of equalizer 12, is a linear function of the coefficients in the numerator of $G(\omega)$ and these coefficients are in turn linear functions of the feedforward tap weights, the derivative with respect to the feedforward tap weights of the error $E(\omega)$ expressed in equation (3) shows that the gradient with respect to these weights of the error $E(\omega)$ can be formed as the average of the product of the tap outputs $Z(\quad)$ and such error $E(\omega)$. The gradient of the error $E(\omega)$ with respect to feedforward tap weights is thus easily determined by a straightforward correlation of the error with the individual tap outputs and results in a set of signals for adjusting individual feedforward tap weights.

However, the derivative of the error $E(\omega)$ expressed in equation (3) with respect to the coefficients of the denominator terms which are a linear function of the feedback tap weights cannot be found by a direct correlation of the tap outputs and the error $E(\omega)$. An additional filtering operation becomes necessary before the error gradient with respect to the feedback tap weights can be generated. Such a filter is indicated in block 20, and has the overall transfer function $H(\omega)$, a composite of the separate transfer function of several parallel branches. The individual transfer functions constituting $H(\omega)$ have the same second order denominators as the transfer functions of the several parallel branches constituting $G(\quad)$ in block 12. The $W(\omega)$ signals applied to auxiliary filter 20 are components of the overall output $Y(\omega)$ and are derived from the individual branches of block 12. When signals $W(\omega)$ are operated on by the transfer function $H(\omega)$, the resultant outputs $U(\omega)$ appearing in cable 33 are in a condition to be correlated with the error $E(\omega)$ in multiplier 34 and integrator 36 by way of cables 33 and 35 as shown in FIG. 1.

The product $E(\omega)U(\omega)$ out of multiplier 34 on cable 35 has its several components averaged and smoothed out in integrator 36. The outputs of integrator 36 constitute the gradient of error $E(\omega)$ with respect to the feedback tap weights of the several parallel branches. These outputs become then pole control signals directed to the adjustment of the feedback weighting factors in networks $G(\omega)$ and $H(\omega)$ over control cable 37. The control relationship is such, and this applies to both feedforward and feedback weighting factors, that for every increase in the component of the error gradient with respect to a given factor that factor is decreased and vice versa. The system can be implemented in the alternative to increment the factor in discrete amounts or to accomplish a proportional adjustment.

Figure 2:
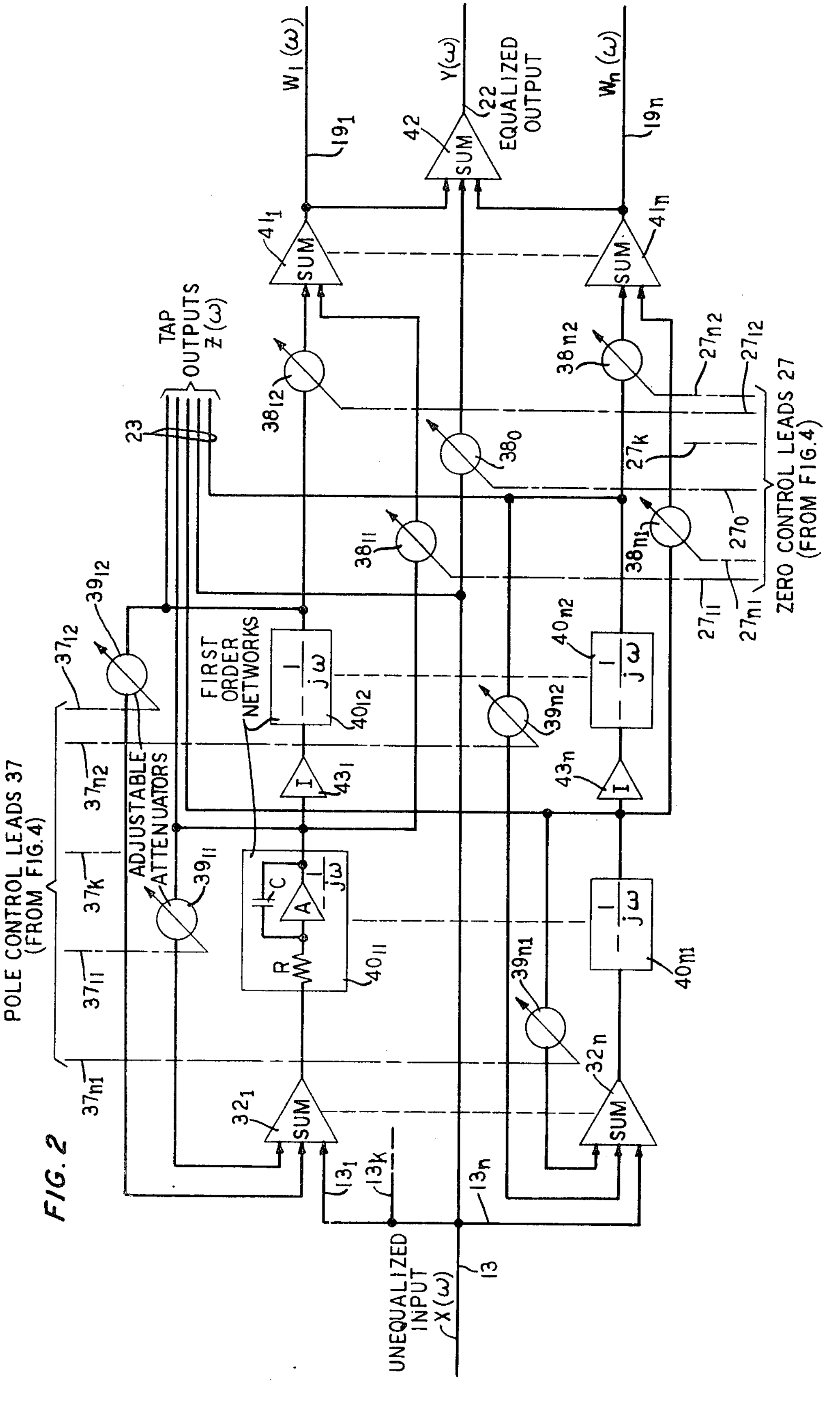
FIG. 2 is a more detailed block schematic diagram of an equalizer structure useful in the practice of this invention.

FIG. 2 is a block schematic diagram of a representative network having the transfer function $G(\omega)$. Broadly, the overall network comprises a ladder of separate parallel tapped second order networks, each parallel rung or branch sharing a common input but having separate outputs which are made both individually and collectively available. Each branch combines at its common input a plurality of weighed contributions from taps therealong and forms at its output a differently weighted summation of contributions from the same taps.

In FIG. 2 the common signal input whose Fourier transform is $X(\omega)$ appears on line 13 is multiplied to the summing inputs of all parallel branches.

Each branch comprises a tapped network with a second order transfer function. Transfer functions are classified according to the highest power of the derivative terms in a differential equation characterizing it. Two first order networks in cascade are employed for purposes of illustration. The intermediate point between first order networks (junction between block $40_{11}$ and inverter $43_1$, for example) and the output points (junction between block $40_{12}$ and attenuator $38_{12}$, for example) are hereafter referred to as taps. Thus, each branch has two taps.

Each first order network 40 illustratively comprises a high-gain inverting amplifier A in series with a resistor R and shunted by a feedback integrating capacitor C, as shown in block $40_{11}$ of FIG. 2. Its transfer function can be shown to be $-1/j\omega RC$, where $\omega$ is frequency in radians per second, and $j$ equals $\sqrt{-1}$. When normalized by assigning unit values to R and C, the transfer function becomes $-1/j\omega$. The transfer functions of two such first order networks in cascade combine as their product to constitute a second-order function which is then proportional to the reciprocal of the square of the radian frequency ($1/\omega^2$). This product is constrained to be positive by providing an inverter 43 between first order networks. The remaining networks 40 are accordingly labeled $-1/j\omega$.

The signals incident at the intermediate and output taps of the several branches are weighted in attenuators 38 and the outputs of these attenuators are combined in a linear adder or summer 41. The upper branch of FIG. 2 includes first order networks $40_{11}$ and $40_{12}$ in cascade with inverter $43_1$ and feedforward attenuators $38_{11}$ and $38_{12}$ connecting intermediate and output taps to summer $41_1$. Individual tap outputs $Z(\omega)$ are made available on the separate leads of cable 23 as shown. A lower branch comprising elements analogous to those in the upper branch are denoted by designators with the subscript $n$.

The several sets of dots between corresponding branch elements indicate that more than two parallel branches are use in practical embodiments. The unequalized input signal on lead 13 is separately attenuated in weighting potentiometer $38_0$ and combined with the outputs of all summers 41 in common summer 42. The link between input and output by way of attenuator $38_0$ effectively forms the $(n+1)$st branch.

The signals incident at the intermediate and output taps of the several branches are also weighted in feedback attenuators 39 and the outputs of these attenuators are combined with the common input signal on leads 13 in summers 32. The upper branch shows attenuators $39_{11}$ and $39_{12}$ connecting intermediate and output taps to the input of summer $32_1$, which also has an input from lead $13_1$. The lower branch is similarly instrumented as shown in FIG. 2.

Respective zero control and pole control leads are shown by broken lines and gathered in cables 27 and 37 in FIG. 2.

The individual outputs of second order branches in summers 41 on leads 19 are designated $W(\omega)$, such as $W_1(\omega)$ on lead $19_1$ in the output of summer $41_1$ in the upper branch. The $W_1(\omega)$ and $W_n(\omega)$ outputs together with those from other branches not specifically shown in FIG. 2 are employed hereinafter to derive control signals for the feedback attenuators. The combined tap outputs in adders 41 are further combined collectively in linear adder 42 to produce the overall equalized output $Y(\omega)$ on lead 22. Adders 32, 41, and 42 shown in FIG. 2 can advantageously be operational amplifiers of any known type.

The second-order networks which constitute each branch of the equalizer of FIG. 2 may be analyzed consistently with the previous theoretical discussion. Let $a_{11}$ and $a_{12}$ be the feedback coefficients instrumented by attenuators $39_{11}$ and $39_{12}$. Let $b_{11}$ and $b_{12}$ be the feedforward coefficients implemented by attenuators $38_{11}$ and $38_{12}$. The numerator of the transfer function represented by the upper branch becomes $$N_1(\omega)=-(b_{11}/j\omega)-(b_{12}/(j\omega)^2)\ ). \quad (4)$$

Multiplying through by $(1/j\omega)^2$ transforms equation (4) into $$N_1(\omega)=-(1/(j\omega)^2)\ (b_{11}j\omega+b_{12}) \quad (5)$$

The denominator of the transfer function similarly becomes $$D_1(\omega)=1+(a_{11}/j\omega)+(a_{12}/(j\omega)^2). \quad (6)$$

Equation (6) readily transforms to $$D_1(\omega)=(1/(j\omega)^2)\ [(j\omega)^2+a_{11}j\omega+a_{12}] \quad (7)$$

The transfer function of the upper branch, noting that the $1/(j\omega)^2$ factors in numerator and denominator cancel, is the quotient:

$$G_1(\omega)=N_1(\omega)/D_1(\omega)=-\frac{b_{11}j\omega+b_{12}}{(j\omega)^2+a_{11}j\omega+a_{12}}. \quad (8)$$

Similar transfer functions are derived for other branches of the network of FIG. 2. For an arbitrary $i$th branch equation (8) becomes $$G_i(\omega)=-\frac{b_{i1}j\omega+b_{i2}}{-\omega^2+a_{i1}j\omega+a_{i2}}, \quad (9)$$

There is one further branch to be accounted for. That is the direct connection of the common input signal through attenuator $38_0$ to summer 42. This branch has the transfer function $b_0$. By combining the transfer functions of all branches, the overall transfer function of the network of FIG. 2 is expressed as $$G(\omega)=\sum_{i=1}^{n}\frac{-b_{i1}j\omega-b_{i2}}{-\omega^2+a_{i1}j\omega+a_{i2}}+b_0 \quad (10)$$

From equation (3) a workable expression for the mean-square error of the network of FIG. 1 is obtained by the rule that the square of the absolute value of a complex number equals the product of itself and its conjugate (indicated by the asterisk) as $$E=\frac{1}{2\pi}\int_{-\infty}^{\infty}|E(\omega)|^2d\omega=\frac{1}{2\pi}\int_{-\infty}^{\infty}E(\omega)E^*(\omega)d\omega. \quad (11)$$

By taking the partial derivative of equation (11) with respect to each tap coefficient useful expressions for the gradient of the error $E$ can be obtained. For a representative intermediate tap the partial derivative with respect to a coefficient in the numerator of equation (10) is derived as follows:

$$\frac{\partial E}{\partial b_{i1}}=\frac{1}{2\pi}\int_{-\infty}^{\infty}\frac{\partial}{\partial b_{i1}}[E(\omega)E^*(\omega)]d\omega. \quad (12)$$

By the product rule for derivatives equation (12) is rewritten $$\frac{\partial E}{\partial b_{i1}}=\frac{1}{2\pi}\int_{-\infty}^{\infty}\left[E(\omega)\frac{\partial E^*(\omega)}{\partial b_{i1}}+E^*(\omega)\frac{\partial E(\omega)}{\partial b_{i1}}\right]d\omega. \quad (13)$$

Standard manipulation further simplifies equation (13) to $$\frac{\partial E}{\partial b_{i1}}=\frac{1}{\pi}\,\mathrm{Re}\int_{-\infty}^{\infty}E(\omega)\frac{\partial E^*(\omega)}{\partial b_{i1}}d\omega, \quad (14)$$

where $Re$ = real part of a complex number.

Substitution of equations (1) and (2) into equation (14) (noting that $\hat{Y}(\omega)$ is a constant whose derivative with respect to $b_{il}$ is zero) yields $$\frac{\partial E}{\partial b_{i1}}=\frac{1}{\pi}\mathrm{Re}\int_{-\infty}^{\infty}E(\omega)\frac{\partial}{\partial b_{i1}}[X(\omega)G(\omega)-\hat{Y}(\omega)]^*d\omega \quad (15)$$

$$=\frac{1}{\pi}\mathrm{Re}\int_{-\infty}^{\infty}E(\omega)X^*(\omega)\frac{\partial G^*(\omega)}{\partial b_{i1}}d\omega. \quad (16)$$

Further substitution of equation (10) into equation (16) results in $$\frac{\partial E}{\partial b_{i1}}=\frac{1}{\pi}\mathrm{Re}\int_{-\infty}^{\infty}E(\omega)X^*(\omega)x$$

$$\frac{\partial}{\partial b_{i1}}\left[\sum_{k=1}^{n}\frac{-j\omega b_{k1}-b_{k2}}{-\omega^2+j\omega a_{k1}+a_{k2}}+b_0\right]^*d\omega \quad (17)$$

$$=\frac{1}{\pi}\int_{-\infty}^{\infty}E(\omega)\left[X(\omega)\frac{-j\omega}{-\omega^2+j\omega a_{i1}+a_{i2}}\right]^*d\omega \quad (18)$$

The term in brackets in equation (18) can be seen to be the signal sample $z_{il}(\omega)$ available at the intermediate tap of the $i$th branch in FIG. 2 and $E(\omega)$ is the output of difference amplifier 18 in FIG. 1.

In a similar fashion it can be shown that the partial derivative of the error $E(\omega)$ with respect to feedforward weight $b_0$ used to control weighting network 38$_0$ in FIG. 2 is $$\frac{\partial E}{\partial b_0}=\frac{1}{\pi}\int_{-\infty}^{\infty}E(\omega)X^*(\omega)d\omega. \quad (19)$$

By Parseval's formula on the equivalence of integrals of time functions and their Fourier transforms, equations (18) and (19) are equivalent to $$\frac{\partial E}{\partial b_{i1}}=2\int_{-\infty}^{\infty}e(t)z_{i1}(t)dt, \quad (20)$$

and $$\frac{\partial E}{\partial b_0}=2\int_{-\infty}^{\infty}e(t)x(t)dt \quad (21)$$

The equation for the partial derivative of the error $E(\omega)$ with respect to the tap weight $b_{i2}$ for the output tap is of the same form as equation (20), with the substitution of the subscript 2 for the subscript 1.

Partial derivatives of the error $E(\omega)$ with respect to the denominator coefficients in equation (10), in particular the coefficient $a_{il}$, are obtained by the same analysis as above with $a_{il}$ substituted for $b_{il}$. When an equation of the form of equation (17) is differentiated with respect to the denominator coefficient $a_{il}$, the following result is obtained $$\frac{\partial E}{\partial a_{i1}}=\frac{1}{\pi}\mathrm{Re}\int_{-\infty}^{\infty}E(\omega)\left\{\left[X(\omega)\frac{-b_{i1}j\omega-b_{i2}}{-\omega^2+j\omega a_{i1}+a_{i2}}\right]\right.$$

$$\left.\times\left[\frac{j\omega}{-\omega^2+j\omega a_{i1}+a_{i2}}\right]\right\}^*d\omega. \quad (22)$$

In equation (22) the first square bracketed term containing in the input signal $X(\omega)$ represents the output functions $W_i(\omega)$ of the $i$th branch as obtained from multiplying $X(\omega)$ and equation (9). The second square bracketed term represents an auxiliary transfer function $H_{il}(\omega)$ implemented by clock 20 in FIG. 1. The product $U_{il}(\omega)$ (inside the curved brackets) of the two square bracketed terms represents an output of auxiliary filter 20 in FIG. 1 which is available for correlation with the error signal $E(\omega)$ in multiplier 34.

Equation (22) by Parseval's formula can be rewritten as $$\frac{\partial E}{\partial a_{i1}}=2\int_{-\infty}^{\infty}e(t)u_{i1}(t)dt. \quad (23)$$

In a similar manner the partial derivative of the error $E(\omega)$ with respect to the output tap weight $a_{i2}$ can be derived as:

$$\frac{\partial E}{\partial a_{i2}}=\frac{1}{\pi}\mathrm{Re}\int_{-\infty}^{\infty}E(\omega)\left\{\left[X(\omega)\frac{-b_{i1}j\omega-b_{i2}}{-\omega^2+j\omega a_{i1}+a_{i2}}\right]\right.$$

$$\left.\times\left[\frac{1}{-\omega^2+j\omega a_{i1}+a_{i2}}\right]\right\} \quad (24)$$

As in equation (22) the first square bracketed term of equation (24) containing the input signal $X(\omega)$ s $W_i(\omega)$. The second square bracketed term represent an auxiliary transfer function $H_{i2}(\omega)$ implemented in block 20 of FIG. 1. The product $U_{i2}(\omega)$ inside the curved brackets of the two square bracketed terms represents another output of auxiliary filter 20 in FIG. 1 which is available for correlation with the error signal $E(\omega)$ in multiplier 34.

By Parseval's formula equation (24) becomes $$\frac{\partial E}{\partial a_{i2}}=2\int_{-\infty}^{\infty}e(t)u_{i2}(t)dt. \quad (25)$$

Equations (18), (20), and (21) show that the partial derivative or gradient of the mean-square error $E(\omega)$ with respect to the numerator tap coefficients $b_{il}$, $b_{i2}$, and $b_0$ can be computed as the correlation between the error signal $e(t)$ and the tap signals $z_{il}(t)$ and $z_{i2}(t)$, and input signal $z_0(t)$ appearing at the respective intermediate and output taps of the several branches of the network of FIG. 2 and at the common input. The correlation operation is expressed as an integral taken over all time between minus and plus infinity. However, in any practical case this infinite time interval can be approximated by a finite interval.

In FIG. 1, the required correlations are performed in multiplier 24, whose inputs are the error signal $E(\omega)$ at junction 28 and the several tap signals $Z(\omega)$ in cable 23, in tandem by way of cable 25 with integrator 26. Integrator 26 operates on the individual products in cable 25 to complete the correlation process and to form zero control signals in broken-line cable 27.

Figure 4:
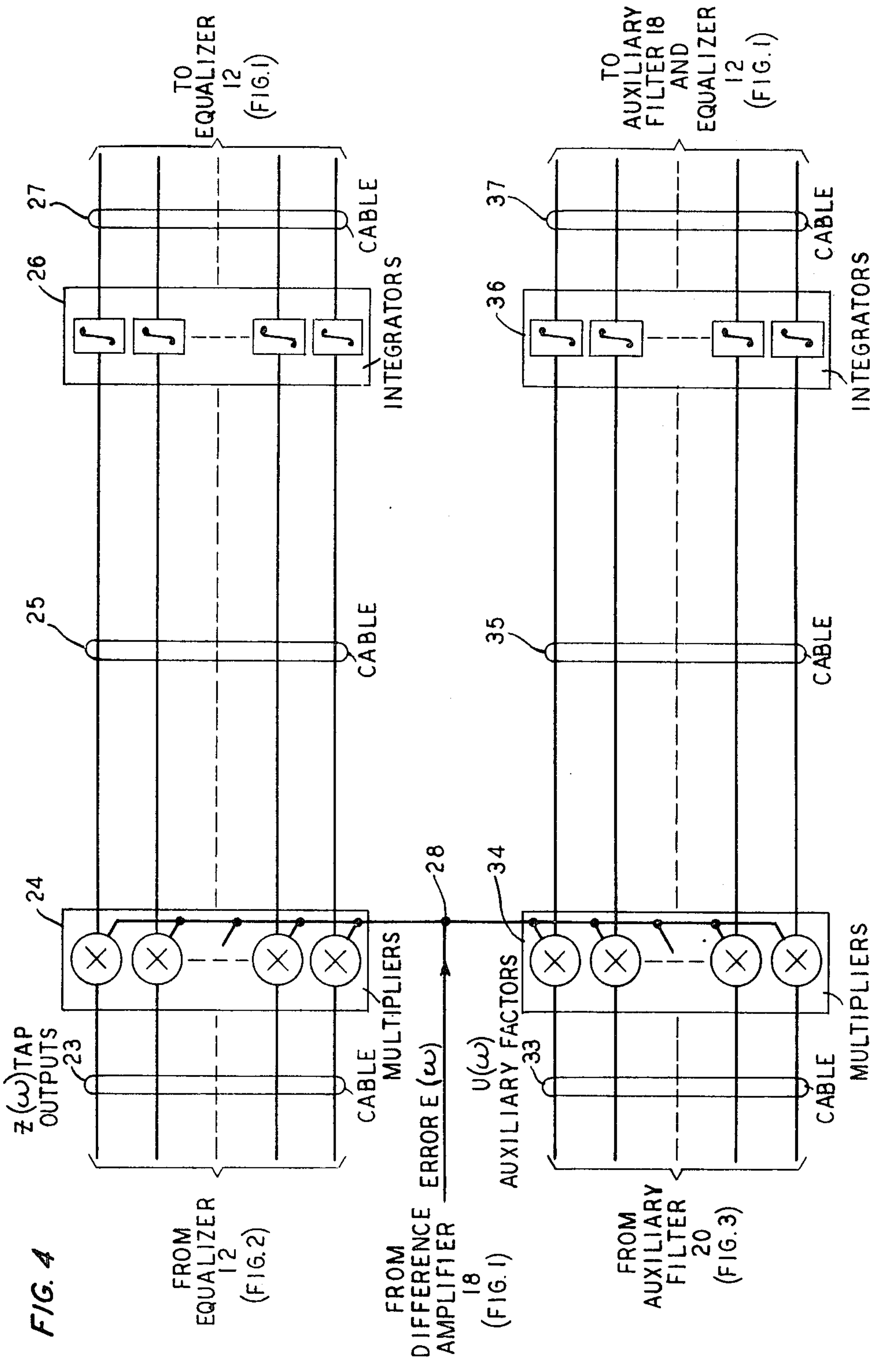
FIG. 4 is a block schematic diagram of the correlation circuits for feedforward and feedback coefficient control of the equalizer and auxiliary filter structures of this invention.

The upper section of FIG. 4 diagrams cables 23, 25, and 27, multipliers 24 and integrators 26. Each conductor discretely shown in FIG. 4 indicates a connection for an individual tap signal. Each of these tap signals is independently correlated in an individual multiplier 24 and an integrator 26. Integrators 26 are appropriately low-pass filters. The individual conductors of cable 27 are further shown in FIG. 2 as separately designated leads 27$_{11}$ through 27$_{nr}$. Signals on these leads control the direction and amount of adjustment of corresponding feedforward attenuators 38 in FIG. 2.

Equations (11), (23), (24), and (25) show that the partial derivative or gradient of the mean-square error $E(\omega)$ with respect to the denominator tap coefficients $a_{il}$ and $a_{i2}$ can be respectively computed as the correlation with the error signal $e(t)$ of the functions $u_{il}(t)$ and $u_{i2}(t)$ (the output function $w_i(t)$ of an individual branch filtered by the auxiliary functions $h_{il}(t$ and $h_{i2}(t)$ of a corresponding branch of auxiliary filter 20). The terms $u_{il}(t)$ and $u_{i2}(t)$ derived from $w_i(t)$, $h_{il}(t)$, and $hd_{i2}(t$ are obtained in auxiliary filter 20 in FIG. 1.

Figure 3:
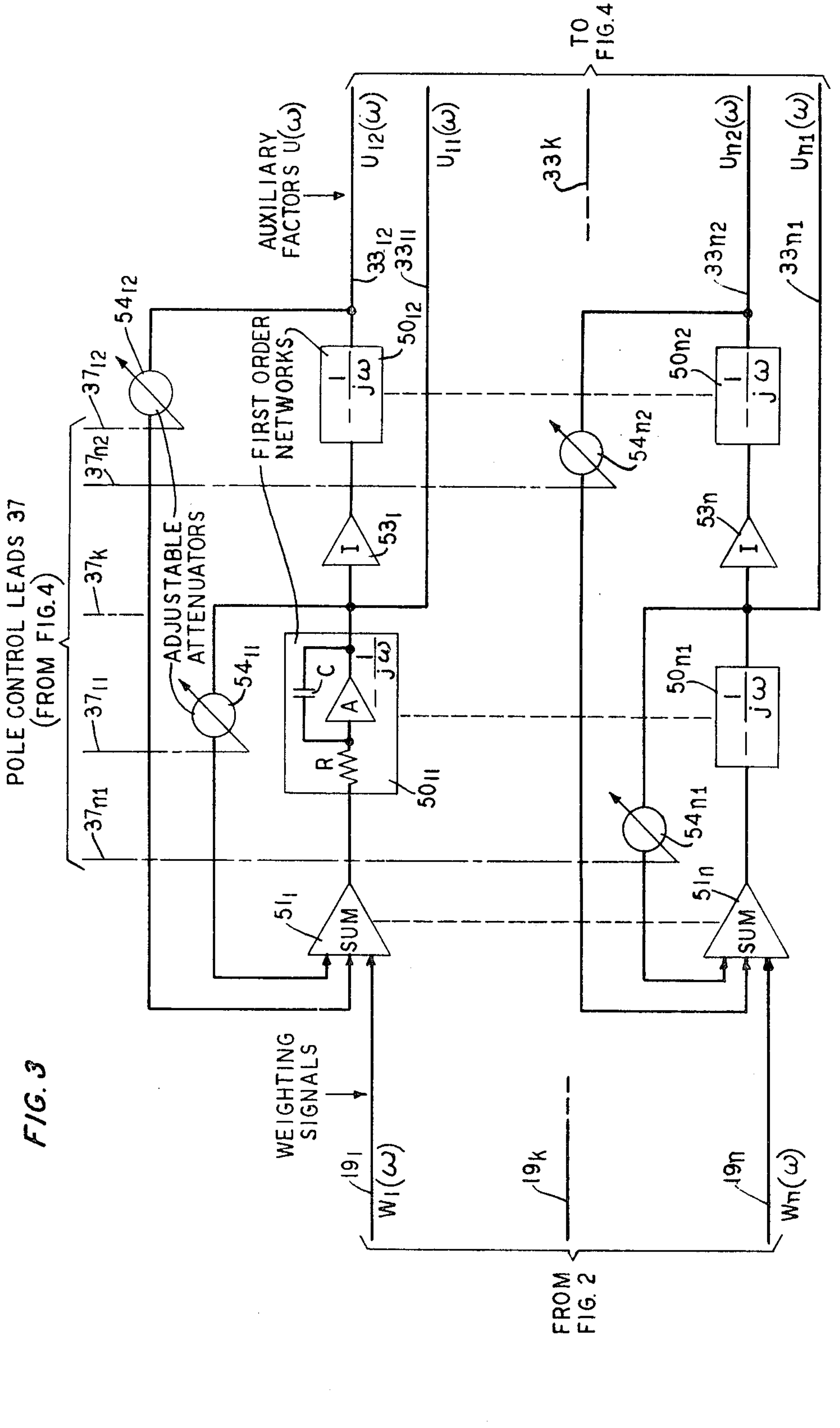
FIG. 3 is a more detailed block schematic diagram of an auxiliary filter structure useful in deriving pole control signals for automatic adjustment of the equalizer of this invention.

Auxiliary filter 20, as shown in detail in FIG. 3, comprises as many parallel branches as there are in equalizer 12. Each branch comprises a pair of first order networks 50 (50$_{11}$ and 50$_{12}$ in the upper branch) in series with an inverter 53 (53$_1$ in the upper branch), an input summation circuit 51 (51$_1$ in the upper branch), having as inputs a weighting signal $W(\omega)$ ($W_1(\omega_1$ in the upper branch) on a lead 19 (19$_1$ in the upper branch) and attenuated tap signals passing through adjustable attenuators 54 (54$_{11}$ from the intermediate tap and 54$_{12}$ from the output tap in the upper branch), and individual tap outputs $U(\omega)$ on leads 33 (tap output $U_{11}$ and $U_{12}$ on leads $33_{11}$ and $33_{12}$ in the upper branch). Pole control leads 37 are shown at the top of FIG. 3. There are no feedforward attenuators in auxiliary filter 20. The bottom and intermediate branches suggested by the dots between corresponding elements of the top and bottom branches are identical in structure to those shown explicitly.

The lower section of FIG. 4 diagrams cables 33, 35, and 37, multipliers 34 and integrators 36. Each conductor shown discretely in FIG. 4 indicates a connection for an individual auxiliary signal. Each of these signals is independently correlated in an individual multiplier 34 and integrator 36. Output signals on leads 37, further shown at the top of both FIGS. 2 and 3, control the direction and amount of adjustment of corresponding feedback attenuators 39 in FIG. 2 and attenuators 54 in FIG. 3.

Attenuators 39 and 54 are implemented with resistors only to realize feedback tap coefficients $a_{l1}$ and $a_{l2}$. Corresponding attenuators in FIGS. 2 and 3 effectively track each other. Since these attenuators provide no phase reversal, the system is unconditionally stable.

While this invention has been described in terms of a specific illustrative embodiment, it is clear that its principle is susceptible of a much wider application by those skilled in the equalizer and electric-wave synthesizing arts.

What is claimed is:

1. Apparatus for synthesizing an arbitrary transfer function in an electric wave transmission system comprising a first plurality of tapped second order networks in parallel between input and output of said apparatus, means for combining with a collective input signal applied to said apparatus selectively attenuated signals fed back from taps on each of said networks, means for feeding forward selectively attenuated tap signals to form an individual output for each of said networks, means for driving a collective output for said apparatus from all of said networks, means for comparing said collective output with a desired reference signal to generate an error output, first means for correlating said error output with tap signals on each of said networks to obtain control signals for the selective attenuation of feedforward tap signals thereon, a second plurality of tapped second order networks in parallel, means for applying the individual outputs of said first plurality of networks to individual networks in said second plurality thereof, means for combining with the individual input to each of said second plurality of networks selectively attenuated signals fed back from taps thereon, and second means for correlating taps signals from said second plurality of networks with said error output to provide control signals for selective attenuation of signals fed back to the inputs of each of said first and second pluralities of networks.

2. Apparatus as defined in claim 1 in which each individual network in said first and second pluralities thereof comprises a pair of first order networks in cascade.

3. Apparatus as defined in claim 2 in which each of said first order networks comprises a high-gain amplifier with capacitive feedback.

4. Apparatus as defined in claim 1 in which said means for feeding forward selectively attenuated tap signals comprises a plurality of multipliers whose range includes both positive and negative values, and in which said means for combining with said input signal selectively attenuated feedback tap signals comprises a plurality of multipliers whose range is restricted to positive values.

5. Apparatus for equalizing a distorting transmission channel to achieve a desired overall transfer function comprising, in combination with a pair of substantially identical signal sources at respective transmitting and receiving terminals of said channel, at the receiving terminal of said channel a relatively fixed reference filter operating on the output of said receiving-terminal signal source to impart a desired signal shaping, an adjustable equalizing filter operating on signals from said transmission channel, and a difference amplifier jointly responsive to the respective outputs of said reference and equalizing filters to form an error output;

said equalizing filter further comprising an input point, an output point, one or more principal second order networks connected between said input and output points, said networks having an intermediate and an output tap, first attenuator means for scaling signals from said intermediate and output taps of each of said principal networks relative to the zeros of a desired transfer function, second attenuator means for scaling signals from said input point, first combining means in each of said networks for signals scaled by said first attenuator means, second combining means for applying a collective signal from said first combining means and said second attenuator means to said output point, third attenuator means for scaling signals from the intermediate and the output taps of each of said principal networks relative to the poles of a desired transfer function, third combining means in each of said principal networks for the signal at said input point and signals scaled by said third attenuator means, first correlating means jointly responsive to said error output and respective signals at said input point, intermediate and output taps of each of said principal networks for controlling the scaling of said first and second attenuator means in a direction to minimize said error output, one or more auxiliary second order networks operating on signals from said first combining means, said networks having an intermediate and an output tap, fourth attenuator means for scaling signals from the intermediate and output taps of each of said auxiliary networks relative to the poles of a desired transfer function, and second correlating means jointly responsive to said error output and respective signals at said intermediate and output taps of each of said auxiliary networks for controlling the scaling of said third and fourth attenuator means in a direction to minimize said error output.

6. The apparatus as defined in claim 5 in which said first and second attenuator means comprise adjustable resistors in series with an inverter.

7. The apparatus as defined in claim 5 in which said third and fourth attenuator means comprise adjustable resistors.

8. The apparatus as defined in claim 5 in which said principal and auxiliary second order networks comprise a cascade of first order networks and a signal inverter, the input of said inverter constituting the intermediate tap in each such network.

* * * * *